United States Patent [19]

Kubo

[11] Patent Number: 4,629,138
[45] Date of Patent: Dec. 16, 1986

[54] APPARATUS FOR FEEDING AND DISCHARGING REELS FROM A MACHINE FOR WINDING VIDEO TAPE ON REELS OF A CASSETTE

[75] Inventor: Yoshiharu Kubo, Tokushima, Japan

[73] Assignee: Awa Engineering Co., Ltd., Tokushima, Japan

[21] Appl. No.: 622,057

[22] Filed: Jun. 15, 1984

Related U.S. Application Data

[63] Continuation-in-part of Ser. No. 450,552, Dec. 16, 1982, abandoned.

[30] Foreign Application Priority Data

Dec. 30, 1981 [JP] Japan ................................ 56-212039

[51] Int. Cl.$^4$ ............................................. B65H 19/30
[52] U.S. Cl. ................................... 242/56 R; 414/763
[58] Field of Search ................. 242/56 R, 56 A, 195, 242/198, 200; 156/502, 505; 414/754, 763, 779, 783, 80

[56] References Cited

U.S. PATENT DOCUMENTS

| 3,004,729 | 10/1961 | Barkhuff | 242/200 |
| 3,582,082 | 6/1971 | Takagi et al. | 242/200 X |
| 3,921,822 | 11/1975 | Dixon | 414/783 X |
| 3,967,739 | 7/1976 | Kumagai | 414/754 X |
| 4,002,560 | 1/1977 | Orantham | 414/80 X |
| 4,114,252 | 9/1978 | Kon et al. | 242/56 R |
| 4,143,776 | 3/1979 | Meyers et al. | 414/763 X |
| 4,168,040 | 9/1979 | Gaiser et al. | 242/56 R |
| 4,344,727 | 8/1982 | Chaloupka | 414/80 X |
| 4,372,503 | 2/1983 | Kincheloe | 242/56 R X |

Primary Examiner—John M. Jillions
Attorney, Agent, or Firm—Wenderoth, Lind & Ponack

[57] ABSTRACT

An apparatus for feeding and discharging reels from a machine for winding video tape on reels of a cassette. The machine has a winder for winding video tape on a pair of reels and a feeder for feeding vacant reels to the winder and taking out the reels with video tape wound thereon. The feeder of the invention has a feeding conveyor for transferring a tray on which a pair of vacant reels are removably mounted, a discharge conveyor for transferring a tray on which a pair of reels with video tape wound thereon is mounted, and a supply and discharge device for connecting the discharge conveyor, the feeding conveyor and the winder.

1 Claim, 25 Drawing Figures

APPARATUS FOR FEEDING AND DISCHARGING REELS FROM A MACHINE FOR WINDING VIDEO TAPE ON REELS OF A CASSETTE

BACKGROUND OF THE INVENTION

The present invention relates to an apparatus for winding video tape on reels.

An apparatus for winding long lengths of tape on reels of a video tape cassette and cutting the tape when a predetermined length has been wound has already been in practical use. However, in a conventional apparatus of this kind, although the tape is automatically wound and cut, reels cannot be automatically mounted on the winding apparatus. Rather they are manually mounted one by one. Therefore, this winding step requires much manual labor.

Since video tape cassettes are produced and sold on a large scale, it is very important that the winding step be carried out at a high efficiency and with a small number of workers.

In such a kind of apparatus, the work to be performed per unit time must be chosen in accordance with the work performed in the preceeding and following steps in the factory. However, it is necessary to wind video tape on reels with a strictly controlled tension and in an absolutely correct position, and the speed of winding video tape must not be changed with the work load. Thus, the number of the apparatuses used is controlled in line with the work performed by the preceeding and following steps. For example, if an apparatus for winding video tape can wind video tape on a set of reels each 20 seconds, ten apparatuses are used in a plant in which video tape must be wound on a set of reels every 2 seconds. When a plurality of apparatuses are used together, usually they are arranged in a line with conveyors being arranged in a line in front of the apparatuses so that vacant reels are fed to each apparatus by a corresponding conveyor and then the reels with video tape wound thereon are issued onto the conveyors.

However, in such a construction, since vacant reels and reels with video tape wound thereon are transferred together on the conveyors, the two different kinds of reels must be detected at the terminals of the conveyors, and the construction becomes complicated which is disadvantageous. Further, since conveyors must be designed and provided in correspondence with the number of the apparatuses, such equipment requires much time and labor.

The present invention has been developed in order to eliminate these disadvantages. The object of the present invention is to provide an apparatus for winding video tape on reels of a cassette which performs an increased amount of work in proportion to the number of apparatuses by providing a reel mounting and removing apparatus which can be operated simply, easily and rapidly in correspondence with the amount of the work performed in the plant.

Another object of the present invention is to provide an apparatus for winding video tape on reels of a cassette which can easily exchange a winding apparatus which has gotten out of order by another winding apparatus, so that if an apparatus has gone bad, the operation of the plant need not be stopped.

BRIEF SUMMARY OF THE INVENTION

Now, examples of the present invention will be described below with reference to the appended drawings, in which.

Figure 1:
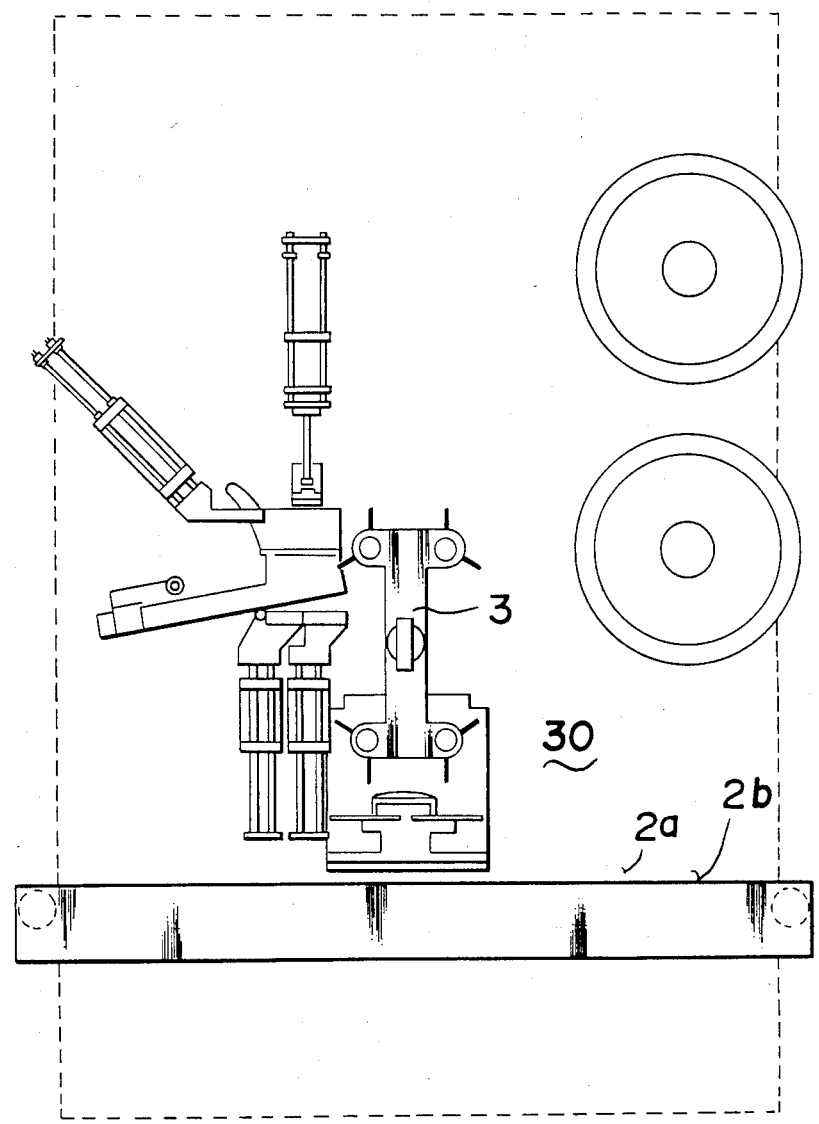
FIGS. 1 and 2 are a front view and a side view of an apparatus for winding video tape on reels of a cassette.
Figure 2:
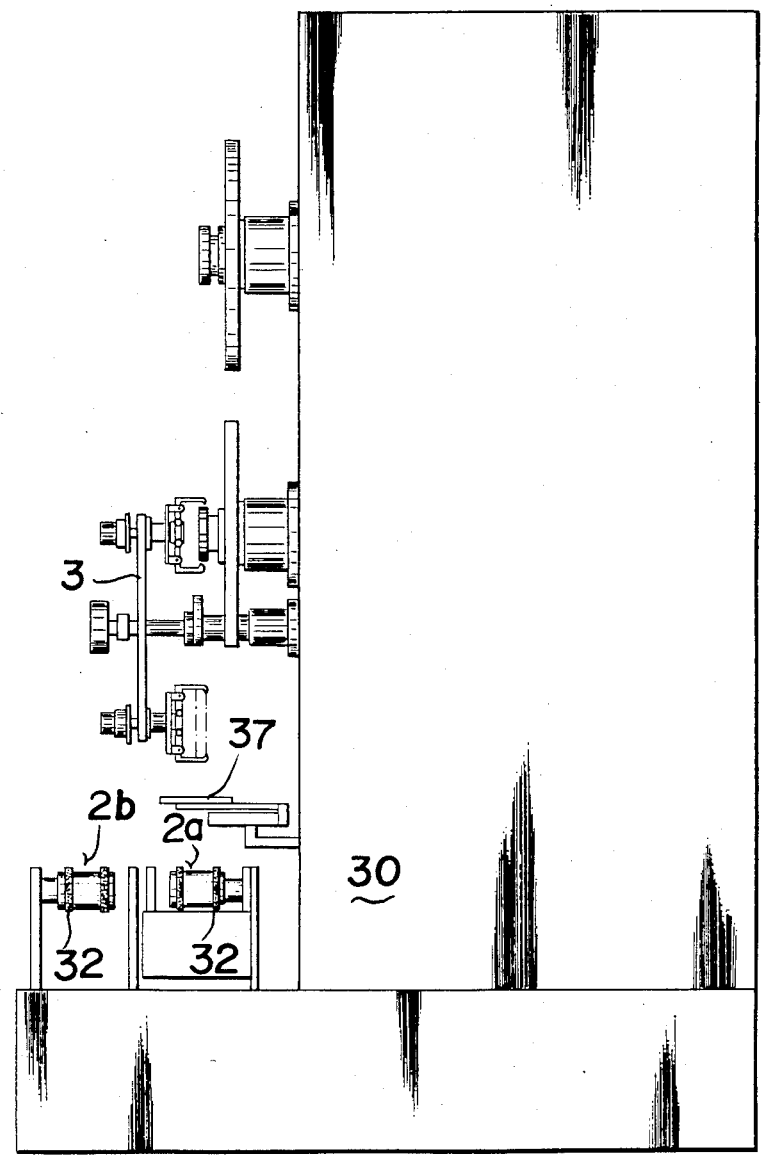

The apparatus for winding video tape on reels of a cassette shown in FIGS. 1 and 2 is provided with a feeding means and a winding means.

The feeding means is constituted by a feeding conveyor 2a, a discharge conveyor 2b and a supplying and discharge means.

Figure 3:
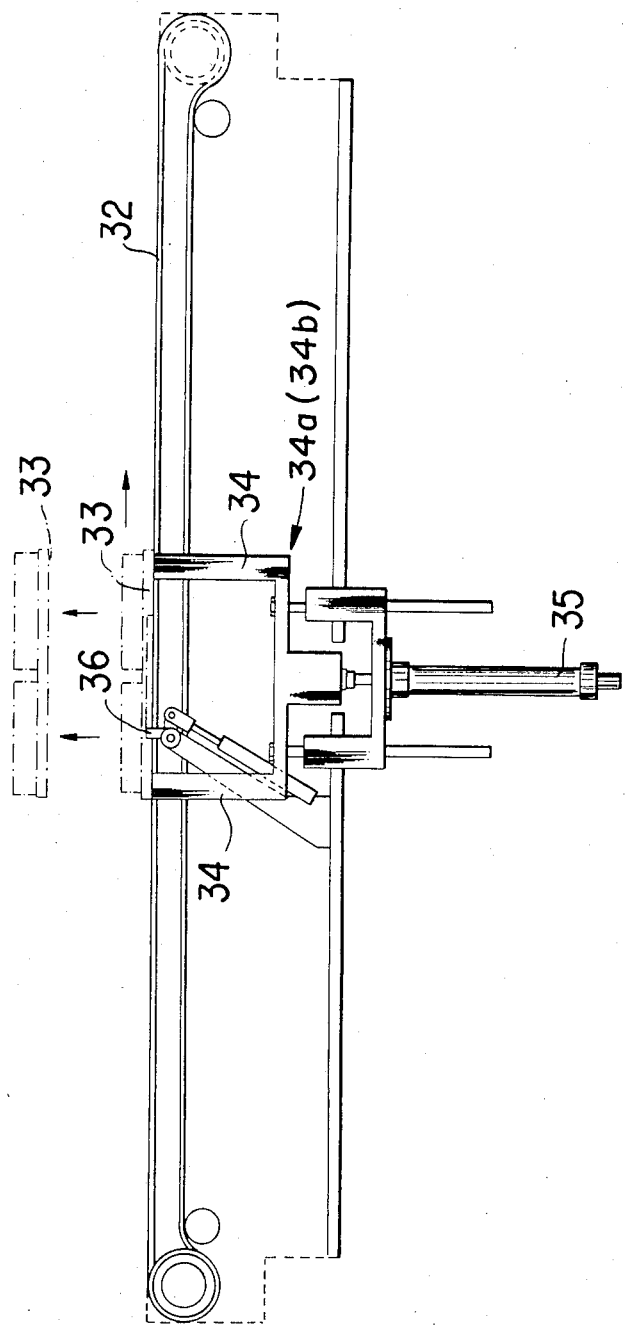
FIGS. 3 and 4 are a front view and a plan view of a feeding conveyor and a discharge conveyor.
Figure 4:
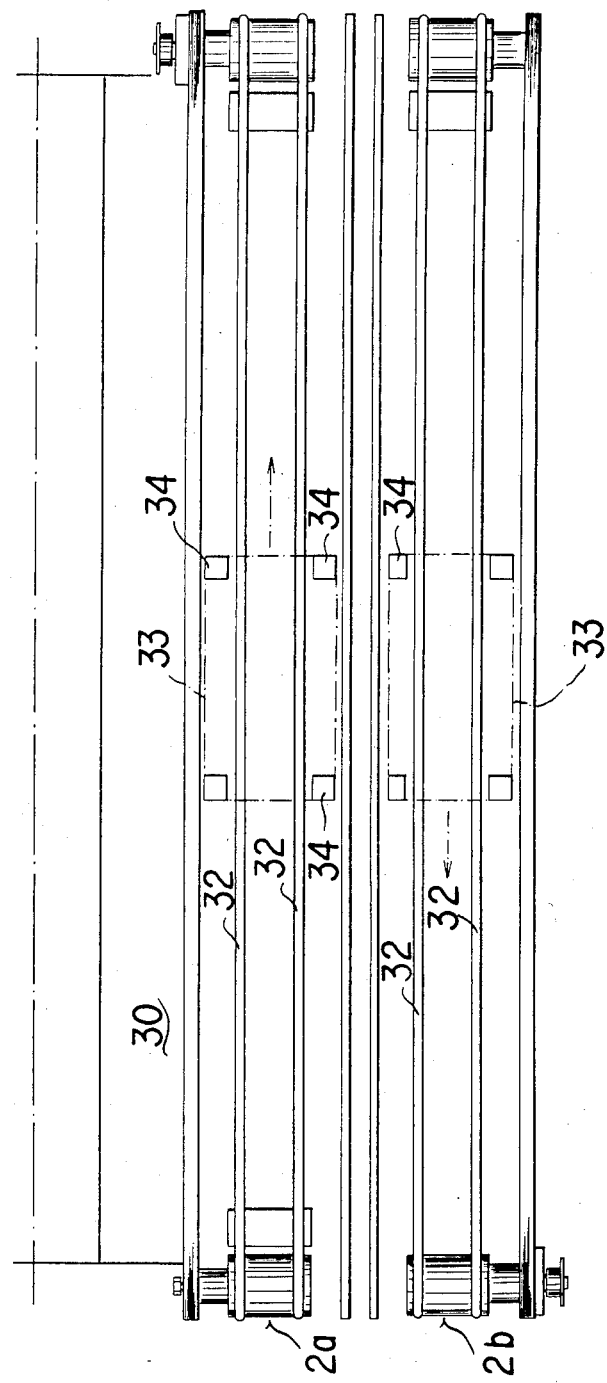

As shown in FIGS. 3 and 4, the feeding conveyor 2a and the discharge conveyor 2b are disposed in parallel with each other in front of a machine casing 30 and have a length which causes them to extend somewhat at either end beyond the side of the casing 30.

Figure 5:
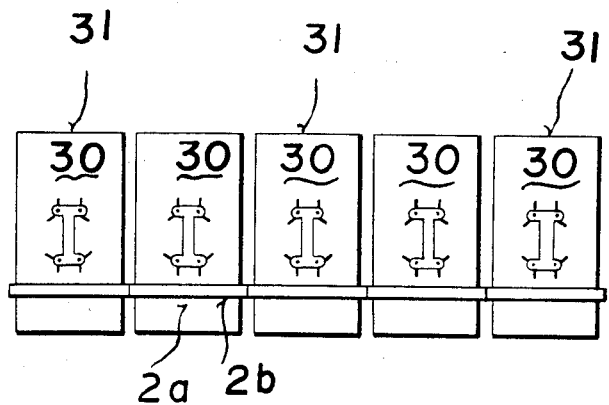
FIGS. 5 and 6 are a front view and a plan view showing a series of apparatuses arranged side by side.
Figure 6:
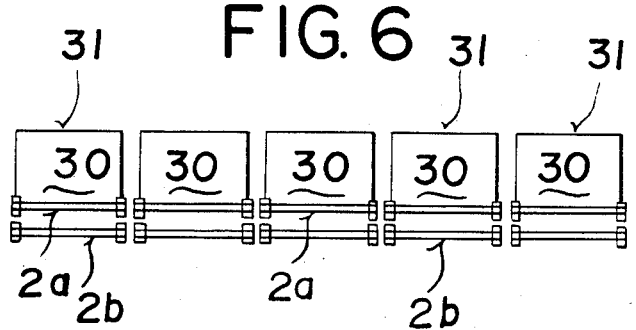

As shown in FIGS. 5 and 6, the feeding conveyor 2a and the discharge conveyor 2b of each apparatus are arranged with their ends in spaced opposed mating relationship with corresponding conveyors of adjacent apparatuses, so that when a plurality of winding apparatuses 31 are arranged in a row, the conveyors can be connected in series.

When the feeding conveyor 2a and the discharge conveyor 2b are horizontally arranged, by arranging them in parallel with the front face of the body 30 both ends of the conveyors match the ends of corresponding conveyors on adjacent apparatuses.

When the winding apparatuses 31 are arranged in a row with their side faces close to each other as shown in FIGS. 5 and 6, the feeding conveyors 2a and the discharge conveyors 2b form feeding conveyor means and discharge conveyor means extending from the side face on one end to the side face on the other end.

When the winding apparatuses are arranged in a column with their front and rear faces close to each other (not shown), the discharge conveyor is elongated so that its front and rear end extend beyond the side face of the body 30.

As shown schematically in FIGS. 5 and 6, the ends of the feeding conveyor 2a and the discharge conveyor 2b preferably protrude somewhat beyond the end faces of the body 30. However, if the ends of the conveyors are not protruding, trays on a conveyor can be transferred onto a neighboring conveyor only when the ends of the conveyors are close to the end faces of the body 30.

The feeding conveyor 2a and the discharge conveyor 2b transfer trays 33 resting on two belt members 32. As shown in FIG. 4, the feeding conveyor 2a and the discharge conveyor 2b transfer the trays in opposite directions.

The supply and discharge means is provided with a raising member for turning a tray fed in a horizontal position into a vertical position and a tray which is in the vertical position into the horizontal position, an urging member for each conveyor for urging a tray from the raising member onto the discharge conveyor and from the feeding conveyor onto the raising member, and a rotating arm 3 for passing the tray between the raising member and the winding means.

The urging members are shown in FIGS. 3 and 4. Each urging member comprises four legs 34 for engaging the four corners of the lower face of tray 33 between the belt members 32 of the feeding conveyor 2a and the discharge conveyor 2b, and a vertical cylinder 35 for moving the legs 34 in the vertical direction for urging the trays upwardly and for lowering them.

Figure 7:
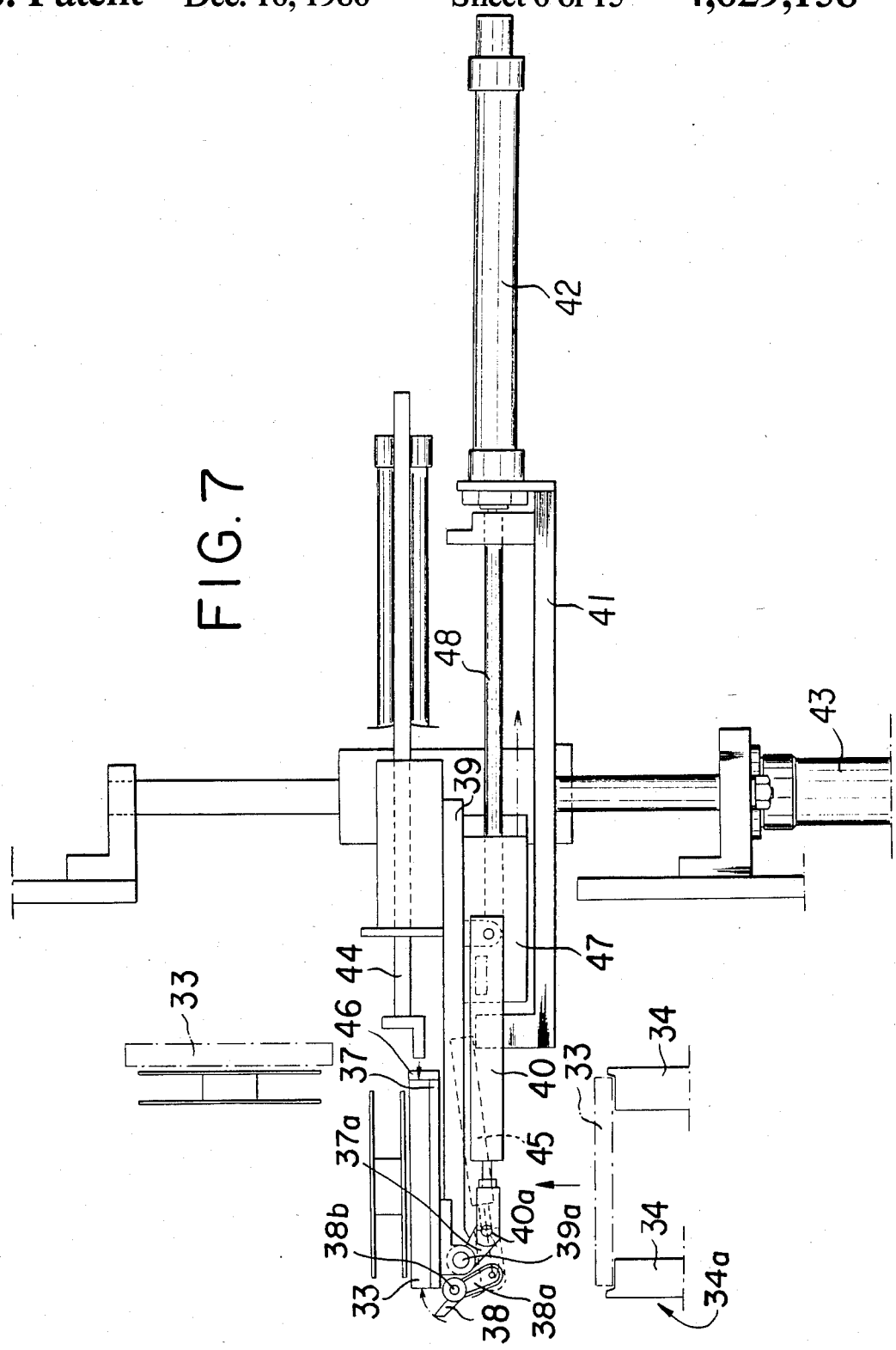
FIGS. 7 and 8 are a side view and a plan view of an example of a transfer means.
Figure 8:
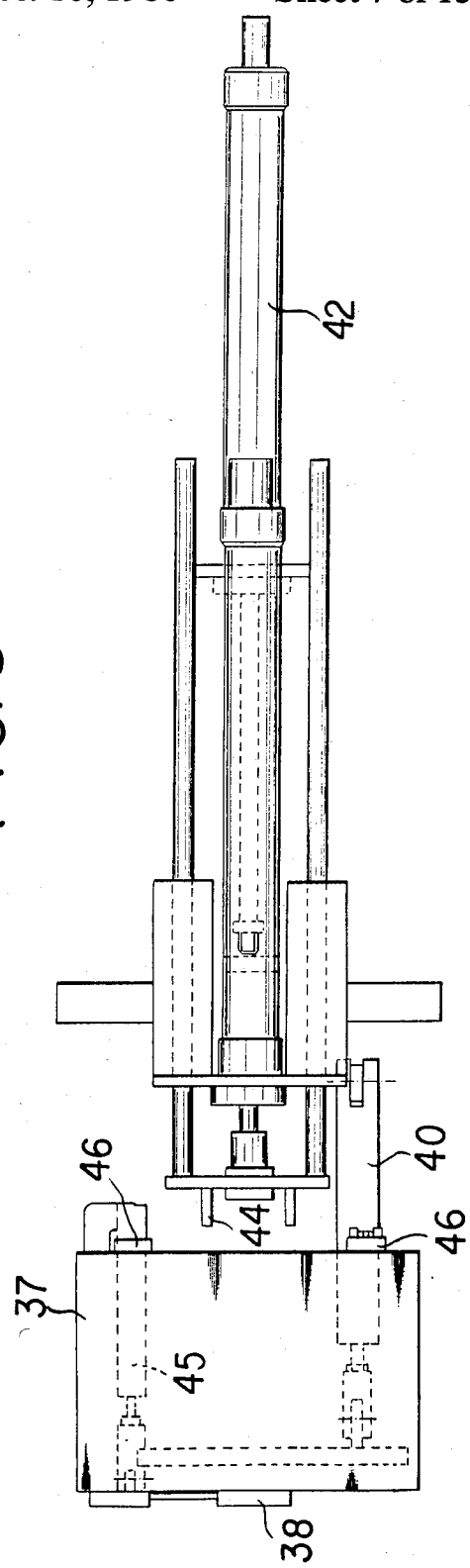

As shown in FIGS. 3 and 7, the urging member 34a located below the feeding conveyor 2a stops the tray 33 on the feeding conveyor 2a at a predetermined position by means of a stop 36, and then the piston rod of the vertical cylinder 35 is pushed out so that the four legs 34 urge the tray 33 up to a height with the base 37 of the raising member in the lower position. The base 37 is inserted under the lower face of the tray 33, and then the urging member 34a is lowered to the original position.

The urging member 34b below the discharge conveyor 2b is raised up to the same height as the upper run of the feeding conveyor 2a, and the tray is transferred from the base 37 of the raising member onto this urging member 34b in the upper position. Then this urging member 34b is lowered to transfer the tray onto the discharge conveyor 2b.

The raising member comprises the base 37 for supporting the tray 33 thereon, a catch 38 for clamping the tray 33 on the base 37, a pivotally movable support 39 on which the base 37 is pivotally mounted on shaft 39a so as to be pivoted through 90 degrees, a pivoting cylinder 40 mounted on the bottom of support 39 for pivoting the base 37, a vertically movable support 41 on which the movable support 39 is mounted so as to be movable rightwardly and leftwardly in FIG. 7, a moving cylinder 42 on support 41 and connected to support 39 for moving the pivotally movable support 39 rightwardly and leftwardly on the support 41, a raising cylinder 43 for moving the vertically movable support 41 in the vertical direction, and a displacing rod 44 for pushing and displacing the tray 33 from the base 37 laterally onto the urging member 34b for the discharge conveyor 2b.

The catch 38 is pivotally mounted at 38b to the end of the lower face of the base 37. A downwardly elongated arm 38a of the catch 38 is connected to the rod of a catch actuating cylinder 45 on the bottom of support 39. When the rod of the catch cylinder 45 is extended, the catch 38 is pivoted in a direction to clamp the end face of the tray 33 on the base 37, and on the other hand when the rod is retracted, the catch 38 is pivoted away from the tray 33 to a position below the upper surface of the base 37.

The base 37 has clamping stops 46 at the edge toward the apparatus casing 30, i.e. the right side in FIG. 7. The left side portion of the lower face of the base 37 has an arm 37a extending downwardly which is pivotally connected by the shaft 39a to the movable support 39 and the lower end of the arm 37a is connected by a pin 40a to the head of the rod of the inclining cylinder 40. The rear end of the inclining cylinder 40 is connected by a pin to the movable support 39.

The movable support 39 has a cylindrical member 47 on the bottom thereof which is movably mounted in line with a guide 48 of the vertically movable support 41 and connected to the head of the rod of the moving cylinder 42 mounted on the vertically movable support 41.

A displacing rod 44 extends between the clamping stops 46 of the base 37 and displaces the tray 33 mounted on the base 37 onto the discharge conveyor 2b.

The operation of the transfer means having the above described construction comprises the following steps.

(1) With the rods of the inclining cylinder 40 and the raising cylinder 43 retracted and the base 37 being in the unpivoted position shown in FIG. 7, the stop 36 stops a tray 33 being carried along feeding conveyor 2a and having vacant reels thereon at a point just above the urging member 34a for the feeding conveyor, and cylinder 35 is operated, and the legs 34 of the urging member 34a then raise the tray 33.

(2) The rod of the moving cylinder 42 is extended and the base 37 is inserted between four legs 34 beneath the raised tray. (In this condition, the base 37 is horizontally positioned and the catch 38 is located below the upper face of the base 37.)

(3) The rod of the catch cylinder 45 is extended and the catch 38 engages the tray and clamps it against the clamping stops 46 on the right side edge of the base 37, and then the legs 34 of the urging member 34a are lowered.

Figure 9:
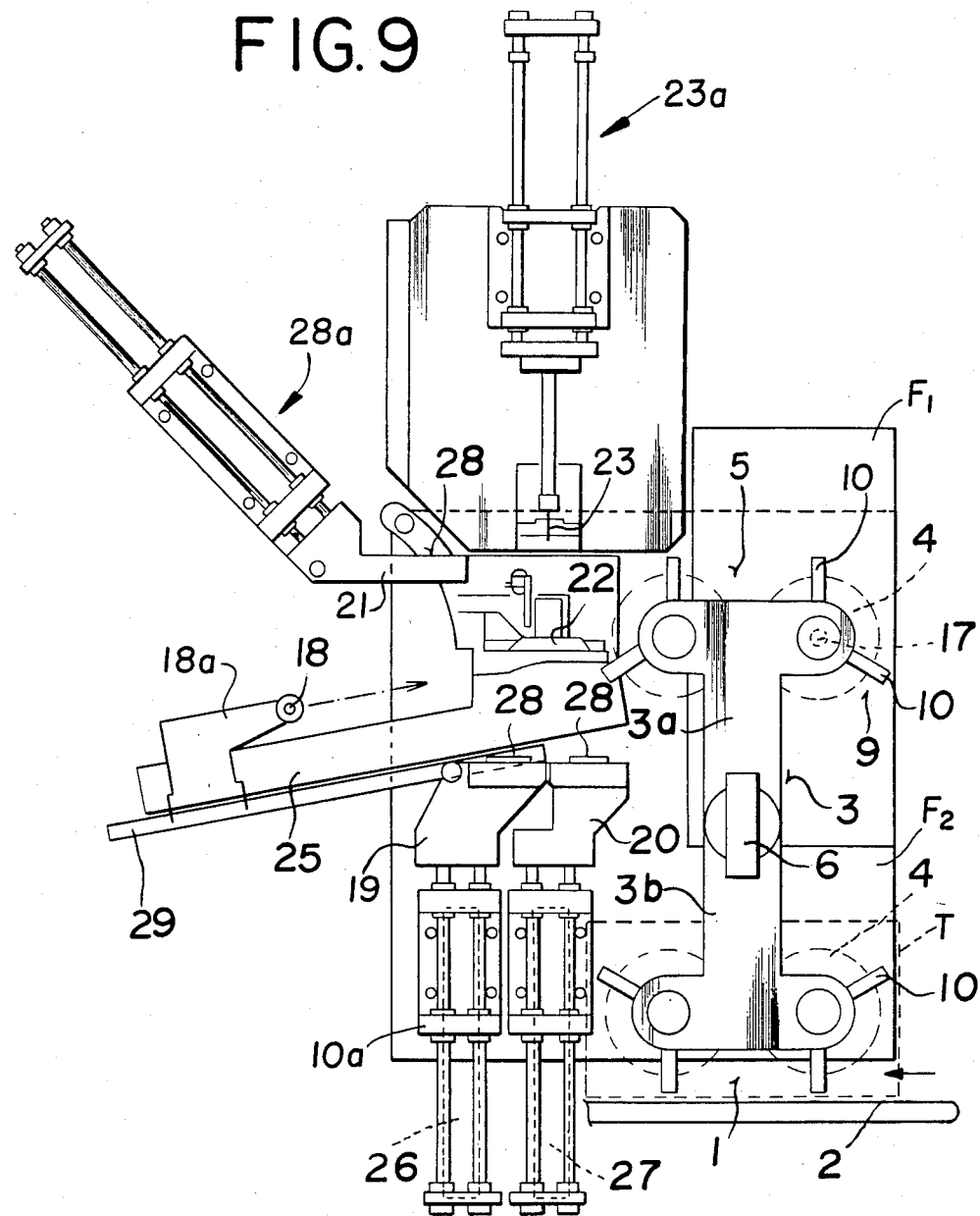
FIGS. 9 and 10 are a front view and a side view of an apparatus for winding video tape on reels of a cassette.

(4) The rod of the moving cylinder 42 is then retracted and the movable support 39 is displaced to the right, the rod of the inclining cylinder 40 is retracted and the base is pivoted to the upright state, and the rod of the urging cylinder 43 is extended whereby the tray 33 is raised to a transfer position 1 (see FIG. 9).

(5) The tray 33 in the transfer position is held while a rotating arm 3 then transfers the reels from the tray to the winding means (to be described hereinafter).

Figure 10:
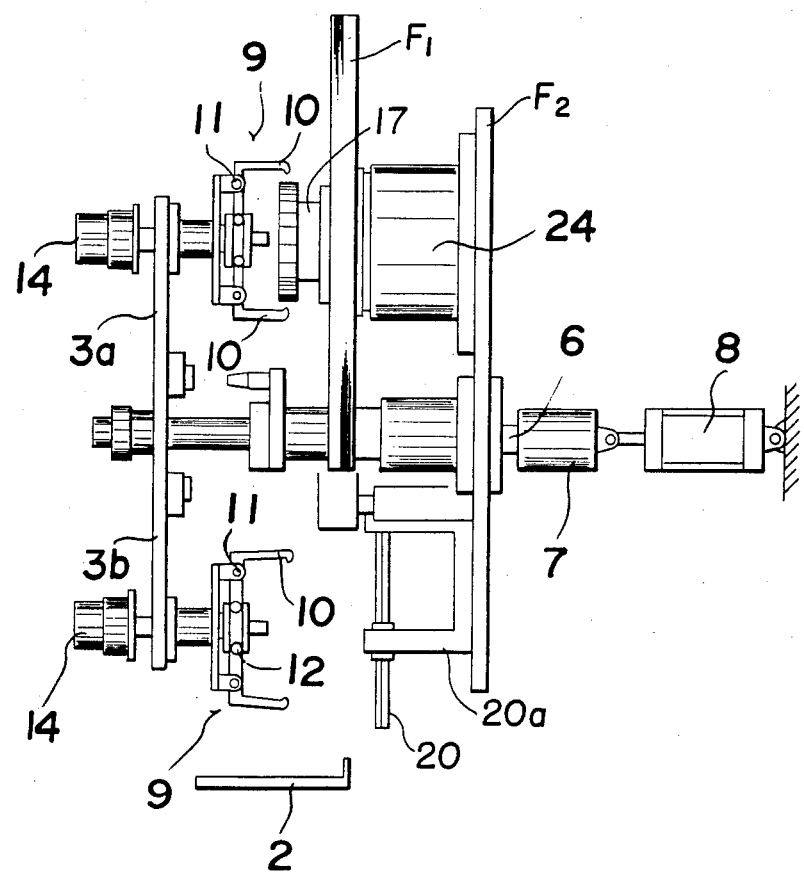

In the winding apparatus, when the rotating arm 3 shown in FIGS. 9 and 10 rotates through 180 degrees, the reels 4 in the transfer position 1 are transferred to the winding position 5 and the reels 4 in the winding position 5 are transferred to the transfer position 1.

Figure 11:
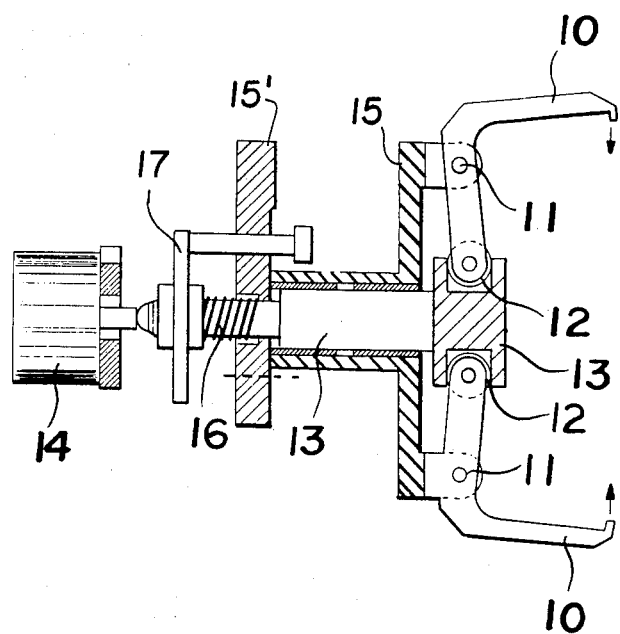
FIG. 11 is an enlarged sectional view of a reel holding member used in the apparatus of FIGS. 9 and 10.

The rotating arm means of the winding apparatus shown in FIGS. 9-11 comprises a rotating arm 3 rotatably mounted around the axis of a shaft 6 equally spaced from the transfer position 1 and the winding position 5, and the shaft 6 on which arm 3 is mounted for rotation in the plane including the transfer position 1 andthe winding position 5 i.e. in a vertical plane in FIGS. 9 and 10. With this construction, when the rotating arm 3 rotates through 180 degrees, the reels 4 in the transfer position 1 are transferred to the winding position 5 and the reels 4 in the winding position 5 are transferred to the transfer position 1.

The shaft 6 of the rotating arm 3 is connected to a motor reduction gear means 7 for rotating the shaft in increments at a pitch of 180 degrees. The shaft 6 is reciprocally axially displacable in frame members $F_1$ and $F_2$ by a piston-cylinder device 8 so as to remove reels held by holding members 9 on the arm 3 from the winding means, described hereinafter, and the tray 33 and then after the arm 3 is rotated, to remount the reels on the winding means and the tray.

The arm 3 has arm portions 3a and 3b extending radially from the shaft 6. The arm portions 3a and 3b are equal in length and have a pair of holding members 9 at the respective outer ends thereof.

Each holding member 9 comprises, as shown in FIG. 11, a plurality of clamping arms 10 spaced around the axis thereof which clamp the reel 4 from at least three directions. The clamping arms 10 are each L shaped and rotatably mounted on a pin 11 adjacent the bent portion on a support 15, and are each provided with a roller 12 at the end near the axis of the holding member.

Each roller 12 is positioned in a groove provided in the end of a reciprocating shaft 13 which is movable along the axis of the holding member by a piston-cylinder device 14 against the action of a spring 16 and guided by guide rod 17 slidable through an opening in support portion 15'. When the reciprocating shaft 13 is pushed rightwardly in FIG. 11, the clamping arms 10 are opened, and upon retraction of the piston-cylinder device, the reciprocating shaft 13 is pushed leftwardly by the coil spring 16. Thus the clamping arms 10 grasp and release a reel.

The winding means is used for winding a given length of tape on each of a pair of reels 4 transferred to the winding position 5. The winding means comprises two shafts, a fixed shaft 17 on frame $F_1$ and a movable shaft 18, vertically movable supports 19 and 20 which are connecting members, a video magnetic tape table 21, a tape table 22 and a cutter 23, the operation of which is shown in FIGS. 12 to 25.

The fixed shaft 17 is positioned at the location of the rotational axis of a reel 4 carried on the rotating arm 3 when it is on the righthand side of the winding position 5, and shaft 17 is rotated by a motor 24 mounted on frame $F_2$ and winds a given length of video tape on the reel 4 mounted on the fixed shaft 17 by the action of the rotating arm means and a holding member 9.

The movable shaft 18 is mounted in a shaft holder 18a which in turn is slidably mounted on a guide 25 so as to be movable toward and away from a position spaced laterally to the left of the fixed shaft 17 in FIG. 9 a distance equal to the spacing between a pair of reels on the arm 3, and the holder 18a is connected to a piston-cylinder device 29 for being displaced along guide 25 thereby.

The vertically movable supports 19 and 20 are mounted on the piston rods of piston-cylinder devices 26 and 27 mounted on brackets 10a and 20a in frame $F_2$ so that they are independently movable across the path of the shaft 18. On the upper end surfaces of the vertically movable supports 19 and 20 are air suction ports 28 constituting means for holding the video tape thereagainst by suction.

In the upper surface of the magnetic tape table 21 is provided an air suction port constituting means for holding video tape thereagainst by suction. The magnetic tape table 21 is disposed above the lefthand vertically movable support 19 and is movable along a diagonal line downwardly to the right and upwardly to the left by a piston-cylinder means 28a.

The adhesive tape table 22 is disposed above the space between the two vertically movable supports 19 and 20 and is movable in the vertical direction. The adhesive tape table 22 comprises means for attaching an adhesive tape to the upper surface of the tape held on the vertically movable supports 19 and 20.

The cutter 23 is positioned above the movable supports 19 and 20 in a position to cut the tape held by the vertically movable supports 19 and 20. For this purpose, the cutter 23 is provided just above the space between the two vertically movable supports 19 and 20 and is movable in the vertical direction by piston-cylinder means 23a.

Figure 12:
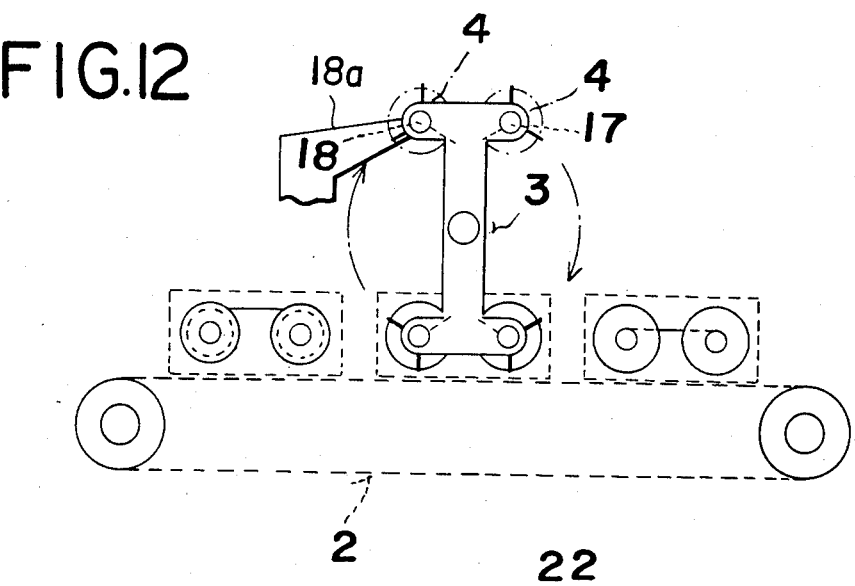
FIGS. 12 to 25 are schematic front views showing the steps of winding video tape on reels in the apparatus of FIGS. 9 and 10.
Figure 13:
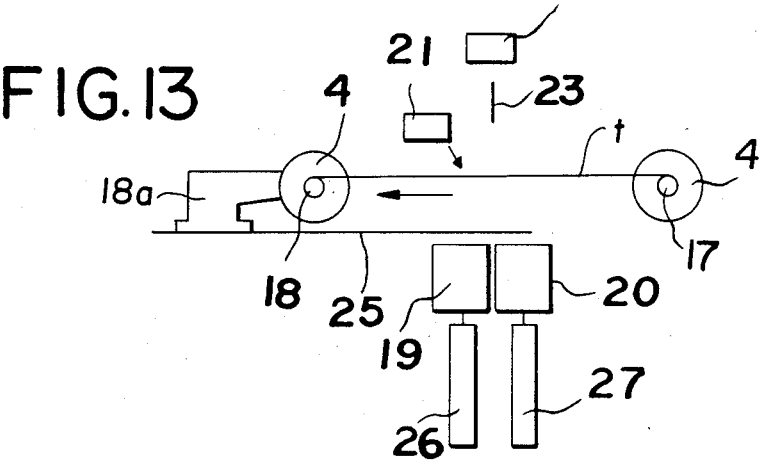

The operation of the apparatus for winding tape on reels comprises a repetition of the following steps. (1) As shown in FIG. 12, with the holder 18a moved to the rightmost position in FIG. 9 to position movable shaft 18 in the position spaced laterally to the left of fixed shaft 17, as described above, two reels in a set are mounted on the fixed shaft 17 and the movable shaft 18 respectively by means of holding members 9 on rotating arm 3, the arm rotating into the FIG. 12 position with the holding members 9 carrying reels 4 from a tray T and then moving toward the shafts 17 and 18 by the piston-cylinder device 8 to place the reels on the shafts after which the holding members are operated to release the reels and the arm 3 is moved back away from shafts 17 and 18. (2) Then, as shown in FIG. 13, the movable shaft 18 is displaced leftwardly along the guide 25 and unwinding a short tape t previously wound on the reels 4, as is conventional.

Figure 14:
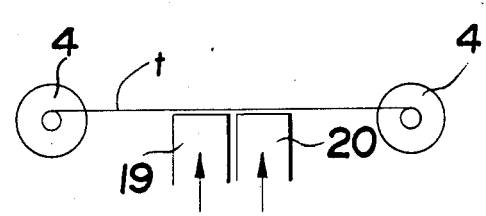
Figure 15:
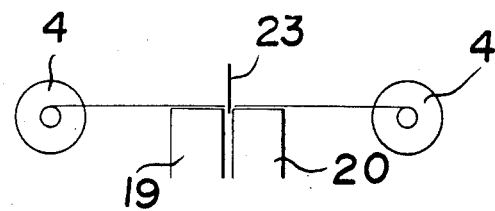
Figure 16:
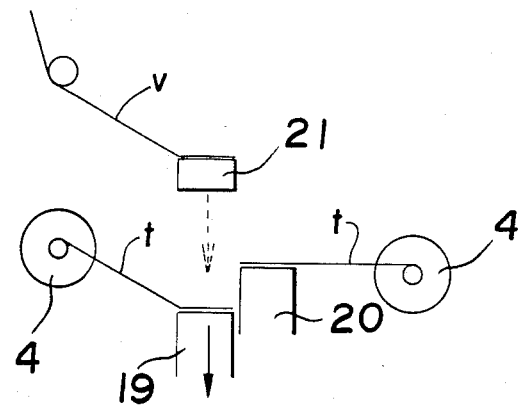
Figure 17:
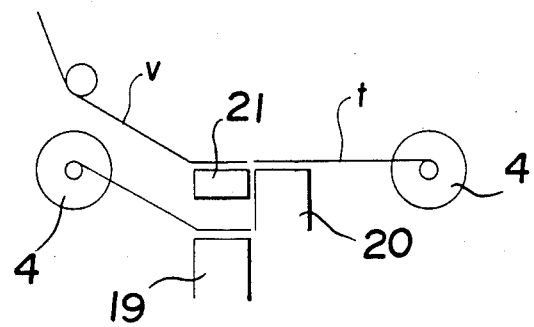
Figure 18:
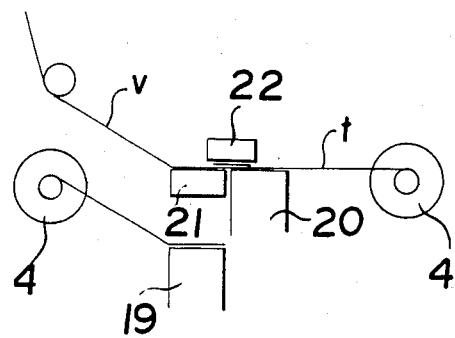
Figure 19:
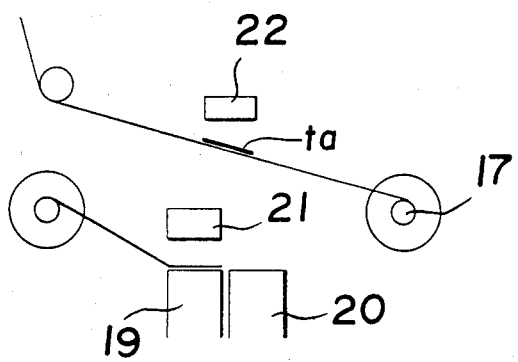
Figure 20:
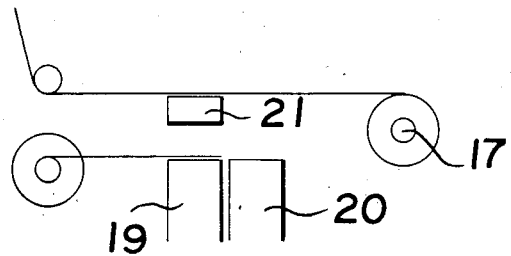
Figure 21:
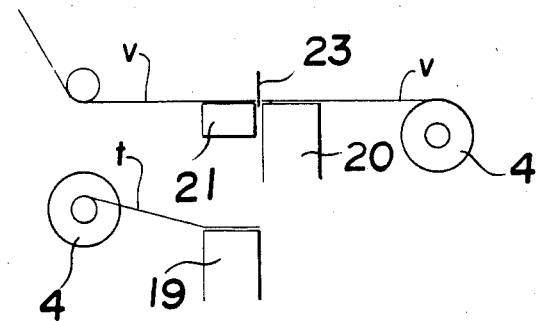
Figure 22:
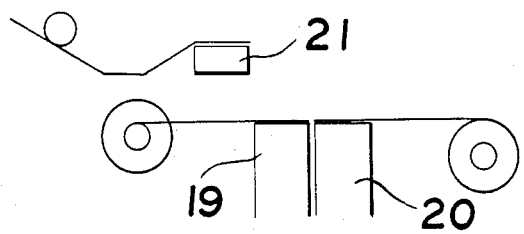
Figure 23:
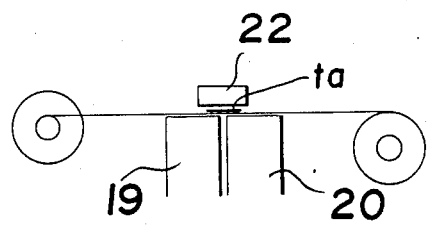
Figure 24:
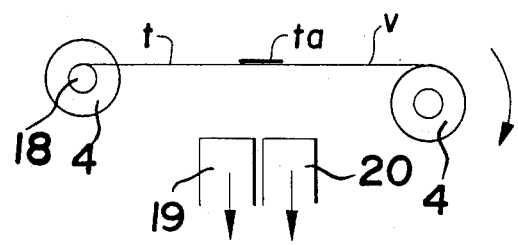
Figure 25:
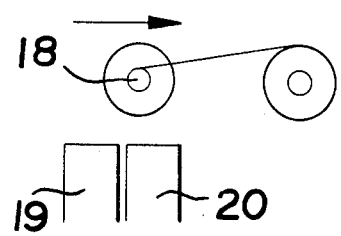

At this time, the vertically movable supports 19 and 20 are in the lower position and the magnetic tape table 21, cutter 23 and the adhesive tape table 22 are in the upper positions. (3) As shown in FIG. 14, the two vertically movable supports 19 and 20 are moved upwardly to contact the short tape t and hold the tape by suction. (4) While the tape t is thus held, as shown in FIG. 15, the cutter 23 is moved down and cuts the tape at the point between the two vertically movable supports 19 and 20 and then moves back up. (5) Next, as shown in FIGS. 16 and 17, only the lefthand vertically movable support 19 is moved down, and the magnetic tape table 21 with the end of the video tape v to be wound onto the reels held on the upper surface thereof by suction moves down until the upper surface is in the same plane as the upper surface of the righthand vertically movable support 20. (6) Next the adhesive tape ta on the end of the short tape t is adhered to the end of the video tape v to connect the video tape v and the short tape t. (7) The adhesive tape table 22 is then moved up as shown in FIG. 19, and the two vertically movable supports 19 and 20 and the magnetic tape support 21 are moved down so that they are spaced from the tape. (8) The fixed shaft 17 is rotated to wind the video tape onto the reel 4 on the fixed shaft 17, as shown in FIG. 20. (9) When the desired length of video tape has been wound on the reel mounted on the fixed shaft 17, the fixed shaft 17 is stopped, and as shown in FIG. 21 the magnetic tape table 21 and the righthand vertically movable support 20 are moved up and hold the video tape v by suction. The cutter 23 is again moved down and cuts the video tape. (10) As shown in FIG 22, the cutter 23 is then moved up, the magnetic tape table 21 is moved up, and the lefthand vertically movable support 19 which has been holding the short tape t is also moved up until it is level with the righthand vertically movable support 20. (11) As shown in FIG. 23, the adhesive tape table 22 is again moved down and adheres a piece of adhesive tape ta to the ends of the short tape t and video tape v held by the movable supports for connecting the short tape t to the rear end of the video tape v. (12) The two vertically movable supports 19 and 20 are then moved down away from the path of movement of the movable shaft 18 as shown in FIG. 24. (13) Finally, as shown in FIG. 25, the fixed shaft 17 is rotated to wind the tape therearound and the holder 18a is moved along guide 25 to move the movable shaft 18 toward the fixed shaft 17 until the two reels are in position to be clamped by the clamping arms 10 of the holding members 9 on the rotating arm 3. The rotating arm 3 then moves toward the shafts 17 and 18 and the holding members are operated to clamp the reels, and the arm 3 is then moved away from the shafts 17 and 18 carrying the reels on which the tape has been wound. Rotation of arm 3 moves the full reels to the transfer position 1, and also transfers empty reels from the transfer position to the winding position 5.

The operations of items (1) to (13) are repeated to wind the video tape on the empty reels.

The details of the operation of the rotating arm 3 for conveying the reels from the transfer position 1 to the winding position 5 and back are as follows. (14) The tray on which two reels are mounted is carried to the raised upright position in the transfer position 1. At this time, as shown in FIGS. 10 and 11, the piston-cylinder device 8 has the piston rod out and the shaft 6 of the rotating arm 3 is displaced leftwardly. (15) The shaft 6 is displaced rightwardly by the operation of piston-cylinder device 8. At this time, the piston of the piston-cylinder device 14 is out, and the reciprocating shaft 13 is displaced rightwardly and the clamping arms are open.

After the piston rod of the cylinder 8 is retracted, the piston rod of the piston-cylinder device 14 is retracted and the clamping arms 10 are pivoted so as to grip the two reels on the tray. (16) The piston rod of the piston-cylinder device 8 is pushed out and the shaft 6 is displaced leftwardly. Then, the drive motor reduction gear means 7 is driven and the shaft 6 is rotated through 180 degrees, whereby the reels are transferred to the winding position. (17) The piston rod of the piston-cylinder device 8 is retracted and the two reels carried by the holding member 9 are mounted on the fixed shaft 17 and the movable shaft 18. (18) The piston rod of the piston-cylinder device 14 is pushed out to pivot clamping arms 10 to release the reel. Then, the rod of the piston-cylinder device 8 is pushed out and the shaft 6 is displaced leftward.

The above-described operation is that which is carried out when no reels are in the winding position 5. If reels on which the video tape has been already wound are in the winding position 5 and empty reels are in the transfer position 1, the operation comprises the following steps. (19) After step 14 as described above, with clamping arms 10 on the holding members on both ends of the rotating arm 3 open, the piston rod of the cylinder is retracted and then the piston rod of the piston-cylinder devices 14 on both ends of the arms is retracted, whereby the clamping arms 10 on the upper end of the arm 3 clamp the two reels in the winding position 5, while the clamping arms 10 on the lower end of the arm 3 clamp the two empty reels in the transfer position 1. (20) The piston rod of the piston-cylinder device 8 is pushed out to move the reels in the winding position 5 off the shafts 17 and 18 and the empty reels out of the tray T. Then the shaft is rotated through 180 degrees whereby the empty reels are transferred to the winding position 5 and the reels on which the tape has been wound are transferred to the transfer position 1. (21) The piston rod of the piston-cylinder device 8 is retracted to mount the empty reels on shaft 17 and 18 and the tape-containing reels in the tray 33, and the piston rods of the piston-cylinder devices 14 are pushed out, whereby the clamped reels are released. Then the piston rod of the piston-cylinder device 8 is pushed out to move the arm 3 away from the reels. Thus the reels on which the tape has been wound are transferred to the transfer position and loaded in the trays, and the empty reels are transferred to the winding position and put on shafts 17 and 18.

The operations (19)–(21) are repeated so that the reels are continuously exchanged between the transfer and winding positions.

It will be understood that when there is a tray 33 with loaded reels in the transfer position 1, operation of the apparatus of FIGS. 7 and 9 in the reverse sequence will place the tray 37 with the loaded reels in the horizontal position as shown in FIG. 7. Thereafter the urging member 34b for the discharge conveyor is raised to the level of the movable support 39, and will be positioned just to the left thereof in FIG. 7. The rod of the catch cylinder 45 is retracted to pivot the catch 38 out of the way, and the pins 44 are then driven to the left in FIG. 7 to slide the tray off the support 39 onto the urging member 34b. The urging member 34b is then lowered to deposit the tray with the full reels thereon on the discharge conveyor 2b.

Effects

The apparatus for winding video tape on reels of a cassette having the abovementioned construction according to the present invention makes it possible simply by arranging a plurality of such apparatuses in a series to increase the amount of the work performed in proportion to the number of the apparatuses. Therefore, the number of the apparatuses can be chosen in accordance with the work required in the preceeding and following steps in the plant and the apparatuses are arranged in a series so they can be easily used.

For example, when the apparatuses are arranged in a row as shown in FIGS. 5 and 6 and are used by feeding trays having empty reels along the feeding conveyor toward the leftmost winding apparatus, some of the trays are accepted by the leftmost winding apparatus so that the reels thereon are wound with video tape, and the remainder of the trays are transferred to the right side winding apparatus and to intermediate winding apparatus. This is repeated successively and all of the remaining trays are accepted by the various winding apparatuses and the reels thereon are wound with video tape.

Consequently, if the time required for treating a tray by a winding apparatus is 20 seconds and one tray is fed every 2 seconds, ten apparatuses are provided so that all the trays fed can be accepted and treated.

Since by arranging the apparatuses in a series, the tray handling ability can be controlled, the apparatus according to the present invention can be simply, easily and rapidly installed in any place. Besides, if one winding apparatus is out of order, only that apparatus has to be taken out and replaced by another apparatus. Therefore, the winding apparatus can be easily maintained and repaired. Further advantageously, if a winding apparatus is out of order, the operation of the whole plant need not be stopped.

What is claimed:

1. An apparatus for feeding the reels of a cassette to an apparatus for winding tape thereon and for discharging the reels with the tape wound thereon from the winding apparatus, the winding apparatus having winding means for winding tape on a pair of reels and a transfer means for transferring a pair of reels from a transfer position to a winding position in the winding apparatus and transferring a pair of reels from the winding position to the transfer position, said feeding and discharging apparatus comprising:
- a feeding conveyor extending along the winding apparatus for carrying a tray on which a pair of empty reels is removably mounted;
- a discharge conveyor extending parallel to said feeding conveyor for carrying a tray on which a pair of reels having tape wound thereon is mounted; and
- a supply and discharge means having a feeding conveyor urging means for lifting a tray from said feeding conveyor to a first position raised above said feeding conveyor, a discharge conveyor urging means for receiving a tray at a second position raised above said discharge conveyor and beside said first position and lowering the tray onto said discharge conveyor;
- a base movable laterally from a position laterally of said first position toward said second position for moving beneath a tray held by said feeding conveyor urging means and supporting such tray, said base including clamping means for clamping a tray to said base;
- pivoting means connected to said base for pivoting said base between said first position and a position in which said tray is vertical and in the transfer position; and
- tray pushing means for, when a tray is on said base support and not clamped thereto, pushing the tray off the base and onto the discharge conveyor urging means in said second position.

* * * * *